Dec. 8, 1964 D. W. BERNARD 3,160,875

MAGNETIC ENCODER

Filed Aug. 1, 1962 2 Sheets-Sheet 1

INVENTOR

David W. Bernard

BY

ATTORNEY

INVENTOR
David W. Bernard

BY

[signature]
ATTORNEY 3,160,875
MAGNETIC ENCODER

David W. Bernard, Norwalk, Conn., assignor to Sperry Rand Corporation, New York, N.Y., a corporation of Delaware Filed Aug. 1, 1962, Ser. No. 214,034
13 Claims. (Cl. 340—347)

This invention relates to equipment for representing digital information in the form of an impulse code, and more particularly to magnetic equipment for converting information from a keyboard to a pulse code.

For many years information has been transmitted by both wire and wireless telegraphic, telemetric, and remote control equipment in the form of impulse codes. The codes have varied from time to time and with the particular use, but the digital form of code transmission has proved to be accurate, rapid and reliable. More recently, the high speed data processing systems; perforated card, relay, electronic and electromechanical systems; have also been utilizing impulse codes rather than analog representations. In most information systems, information to be transmitted or otherwise processed is generally introduced into the system initially from a keyboard, such as the keyboard of a typewriter, a teletypewriter, a card punch or other such device. These keyboard machines serve several purposes, one of which is the translation of the information into the appropriate impulse code. In the past, this conversion was accomplished by the use of rotating switches, diode matrices, and the like. The rotating switches have the serious disadvantage that they are slow operating. The diode matrices are expensive both in initial cost and in maintenance. New, inexpensive and easily operable forms of converters for converting from mechanical motion to electrical impulse codes are needed.

It is the object of this invention to provide a new and improved converter for converting mechanical motion into an electrical impulse code.

It is another object of this invention to provide a new and improved apparatus for translating keyboard information into an impulse code.

It is a further object of this invention to provide a new apparatus for converting keyboard information into an impulse code by the direct utilization of magnetic circuits which are completed by the operation of a keyboard or similar device.

Other objects and advantages of this invention will become apparent as the following description proceeds, which description should be considered together with the accompanying drawings in which.

Figure 1:
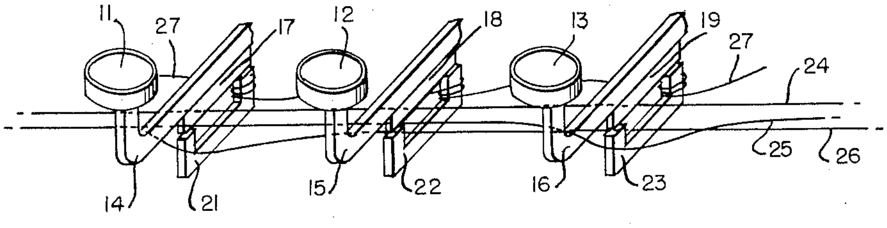
FIG. 1 is a perspective view of a portion of a keyboard illustrating the manner in which this invention may be used.

Referring now to the drawings in detail, and to FIG. 1 in particular, the reference characters 11, 12 and 13 designate keys of a keyboard. Since only a small number of keys are necessary to demonstrate this invention and since the invention is not limited to the form, shape or content of the keyboard, only a few representative keys are shown and will be discussed. Each of the keys 11, 12, and 13 is mounted on one end of a movable lever 14, 15 or 16. The lever 14 carries a block of magnetic material 17, and the levers 15 and 16 each carry a block of magnetic material 18 and 19 also. Mounted below the three levers 11, 12 and 13 are U-shaped magnetic cores, a core 21 lying immediately below the block 17, a core 22 lying immediately below block 18 and a core 23 below the block 19. Signal wires 24, 25 and 26, drive wire 27 are threaded through the cores.

The levers 14, 15 and 16 are mounted to move individually when the appropriate key on the keyboard is depressed. It is immaterial to this invention the manner in which the levers are mounted, but the general manner is to pivot them at a point remote from the key so that as the key is depressed, the other end of the lever is raised to cause the operation of the type bar, switch or other member. As the lever 14 moves downwardly, the magnetic block 17 approaches the core 21. When the lever 14 is fully depressed, the block 17 rests upon the open side of the core 21 to complete the magnetic path of the core. If, then, an electrical pulse is applied to one of the lines, say line 24 for example, an electrical signal will be induced into the other lines 25 and 26. If a code is established to represent each of the individual characters also represented by the individual keys and a single line 24, 25 and 26 provided for each position of the code, then the lines can be threaded through the individual cores in accordance with the code. Consider for example a simple four place binary code. In that code the value "1" is represented by the energization of the line which represents the lowest binary value. To properly wire the cores of FIG. 1, the line representing the lowest binary value of the series would be the only signal or output line threaded through the core beneath the "1" key. Then, when the "1" key is depressed and a pulse is applied to the drive line 27, only the single output line would have an output pulse induced thereon. The other lines, which pass through only open cores, would have only noise induced in them, and the noise can be effectively compensated. Thus, the depression of one of the keys 11, 12 or 13, and the subsequent energization of the drive line 27 results in the generation of output pulses on the lines threaded through the particular core which is closed by the depressed key.

Figure 2:
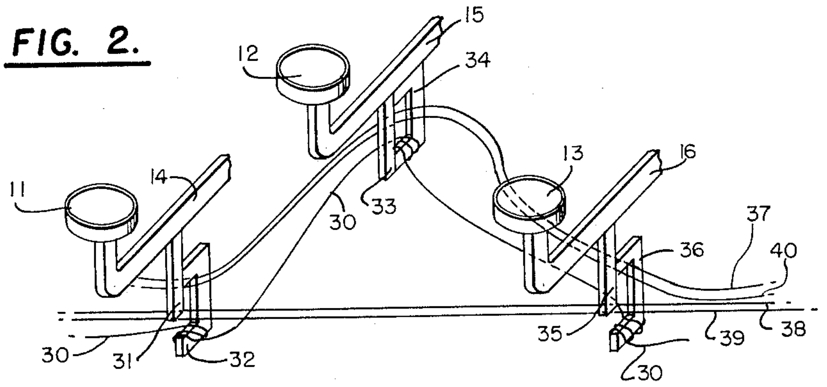
FIG. 2 is a perspective view of a portion of a keyboard illustrating an alternative construction to that of FIG. 1.

The manner of closing the cores is not limited to the particular arrangement shown in FIG. 1. In FIG. 2, keys 11, 12 and 13 are mounted on levers 14, 15, 16, as described above. A bar of magnetic material 31 is attached at one end to the bottom of lever 14 adjacent a core 32, also of magnetic material. In a similar manner, a bar 33 of magnetic material is mounted on the lever 15 adjacent the core 34, and a bar 35 of magnetic material is attached to the lever 16 adjacent a core 36. Each of the cores 32, 34 and 36 is made of magnetic material and is formed in the shape of a U with the open side adjacent the magnetic bars 31, 33 and 35. Wires 37, 38, 39 and 40 are threaded through selected cores 32, 34 and 36 in accordance with the information code established for the particular machine and the drive wire 30 passes through all of the cores 32, 34 and 36. As shown in FIG. 1, the drive wire 30 may pass through each core more than once to form multi-coil windings.

The operation of the device of FIG. 2 is essentially the same as that of FIG. 1 except that the bars 31, 33 and 35 are positioned with respect to the cores 32, 34 and 36 such that each of the bars covers the open side of the corresponding core except for a small portion at the lower end which provides an air gap. As the selected key 11,

12 or 13 is depressed, the bar 31, 33 or 35 slides along the open side of the core to complete the magnetic path and close the air gap. This reduces the reluctance in that particular core, and an electrical pulse applied at that time to the drive winding 30 will induce a pulse in the wires threading the single core which has no air gap.

Figure 3:
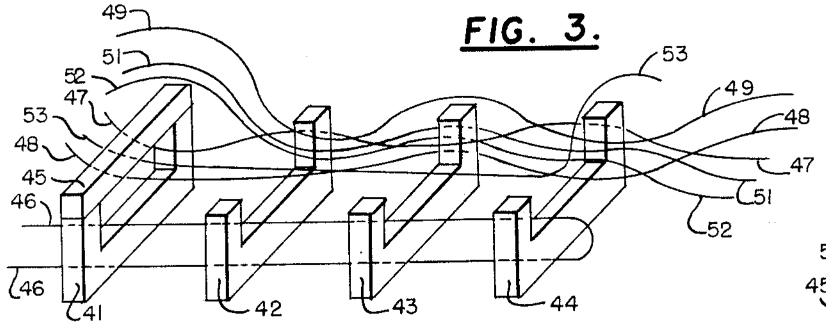
FIG. 3 is a perspective enlarged view of several magnetic cores showing one manner of threading wires therethrough.
Figure 4:
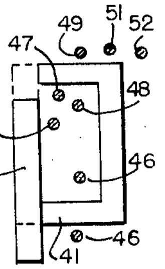
FIG. 4 is a side view of a single core.
Figure 5:
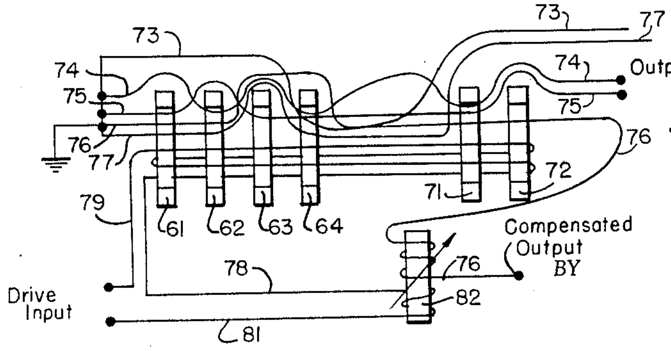
FIG. 5 is a schematic view of several cores together with the wires which thread them.

The wires 37, 38 and 39 are threaded through the cores 32, 34 and 36 in accordance with the code established for the equipment. Thus, each of the wires 37, 38 and 39 pass through some cores and not through others so that the combination of wires passing through any core represents the code combination for the information represented by that core. The wire 30 passes through all of the cores and serves as an energizing or drive winding. When one of the cores is closed by its bar and an electrical pulse is applied to the line 30, a pulse is induced in the other wires passing through the closed core. The manner in which the wires pass through the cores is schematically shown in FIGS. 3, 4 and 5. In FIG. 3, four cores 41, 42, 43 and 44 are shown in perspective with six signal wires 47, 48, 49, 51, 52 and 53 passing through the cores in various combinations. Thus, wire 48 passes through cores 41, 42 and 44, but not through 43. Also, core 41 has wires 47, 48 and 53 passing through it. Thus, when the bar 45 is positioned as shown to complete the magnetic path of the core 41, and an electrical pulse is applied to the wire 46, which is the drive wire, pulses are induced in wires 47, 48 and 53. A side view of the core 41 and its bar 45 together with a plurality of wires passing through the core 41 is shown in FIG. 4.

As mentioned above, when a pulse is applied to the drive windings of the system, relatively large amplitude pulses are induced in the wires passing through the closed cores, but the wires which pass through only open cores have low amplitude noise pulses induced in them due to the leakage flux through the open cores. The noise pulses are equal to the noise generated in one core multiplied by the open number of cores through which each wire passes. FIG. 5 illustrates one manner in which these noise pulses may be eliminated. A series of cores 61, 62, 63, 64, . . . 71 and 72 are shown with lines 73, 74, 75, 76, and 77 passing through them in different combinations. Drive wires 78 and 79 pass through all of the cores 61–72 in several turns to provide a relatively strong input impulse. A compensating core 82 has coiled about it two windings, one which carries the drive signal, and the other which carries the output signal. A compensating core 82 is normally provided for each of the signal lines 73–77.

When an input drive pulse is applied to the system, current flows through the drive windings 79 in all of the cores 61–72 and also through lines 79, 81 and 78 and the winding around the core 82. This drive current passing through the winding on the core 82 establishes a magnetic flux through the core 82 in a first direction. At the same time, the drive current generates leakage flux in each of the cores 61–72, and electrical noise pulses are induced on all of the signal lines. Considering the signal line 76, the noise pulse passing through this line generates magnetic flux in the core 82 by reason of the winding around that core. However, since the two windings on the core 82 are in opposite directions, the two magnetic fluxes generated in that core are also in opposite directions and tend to cancel each other out. The coupling and the flux generated by the drive winding is made variable so that this flux can be regulated to closely cancel the noise flux in the individual line.

There are several modifications of different portions of the above described systems which come to mind and should be mentioned. Two ways of closing the air gaps of the individual cores have been shown. There are, of course, other ways. For example, the bars may be hinged at one end to the core and the motion of the key lever would then move the bar on its hinge to a position which closes the core air gap. Also, if the designation of the depressed key is desired in other than coded form, each core can be provided with its own signal wire, and a common drive wire can be used. Then, when a pulse is applied to the drive wire, a single signal wire will be energized, indicating which key was depressed. The electrical pulses may be applied to the drive wire from any source of a high enough frequency to produce several pulses during the time a key is depressed, or the pulse may be generated in response to some action of the key, the key lever or some other mechanical portion of the keyboard machine. This may be accomplished merely by providing a member common to all of the keys with a switch which is closed whenever that common member operates. In addition, although this invention has been described as operable for digital type information being inserted by the operation of a keyboard, it is quite obvious that it can be used in the other systems. In an analog-to-digital converter, for example, a single common bar may be positioned in response to the analog value to close a specific core and generate a digital code representation of the analog value. Thus, in representing in digital coded form the position of a rotary member, a number of cores can be arranged in a circle and the magnetic bar mounted within the circle to be driven from core to core by the rotary member. The number of wires threading the individual cores follows an established code as indicated above.

Only one means for compensating for the leakage pulses which are produced on the lines passing through the unclosed cores has been described above. There are, of course, other ways in which the leakage pulses can be compensated. One additional way is by threading the wires, in accordance with the selected code, in a first direction through the cores which represent "1's" when they are closed and in the opposite direction through those cores which represent "0's" when closed. Thus, if according to a particular code, a selected digit is represented by three ones and three zeros, then the wires which thread that core would pass through other cores in the opposite direction. The generation of a leakage pulse in the wires by one core would then be compensated by the generation of leakage flux in the opposite direction in other cores. This system works well when the code consists of as many zeros as ones. Then, each wire which passes through a core in a first direction would pass through another core in the opposite direction. If, however, the code is so constructed that the number of ones is not equal to the number of zeros, then some of the wires would have to be threaded through some cores in several turns to assure full compensation. Each wire should pass the same number of times through cores in a first direction as in a second direction.

Figure 6:
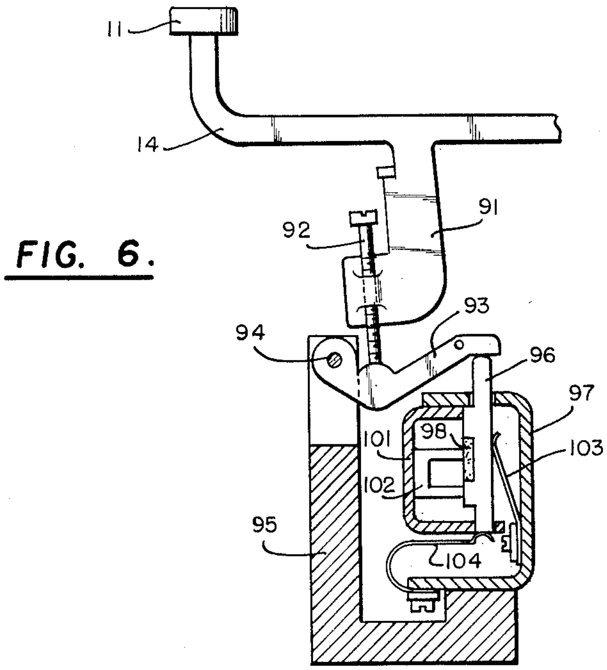
FIG. 6 is a side view, partially in section of one form of suitable operating mechanism for moving the magnetic bars of this invention.

In FIG. 6 is shown one form which the core and operating structure may assume. A key 11 is supported on a lever 14 which also carries a projection 91. In a suitably threaded portion of the projection 91 there is mounted a screw 92 which bears against a lever 93 pivoted for rotation on a shaft 94. The shaft 94 is supported by a base 95 which also supports a guide member 97. Through a hole in one side of the guide member 97 a projecting part of a non-magnetic slide 96 passes to contact the free end of the lever 93. An elongated magnetic member 98 is formed as part of the slide 96. A core support 101 is carried by the guide member 97 and, in turn, supports a U-shaped core 102 generally opposite that portion of the slide member 96 which forms the magnetic bar 98. A spring 103 mounted on the guide member 97 tends to force the slide 96 against the open face of the core 103, and a second spring 104, also mounted on the guide member 97, tends to force the slide member 96 toward the lever 93.

When the key 11 is depressed, the lever 91 pivots about a fulcrum (not shown) and moves the screw 92 against the lever 93. The lever 93 then pivots on its shaft 94 so that its free end forces the slide 96 against the action of the spring 104. As the slide 96 moves, the magnetic bar 98 slides against the open face of the core 102 to close the core 102. Thus, when the key 11 is depressed, the core 102 is closed to form a complete magnetic path. The screw 92 can be used to adjust the relative spacing of the parts so that the best action is obtained.

Figure 7:
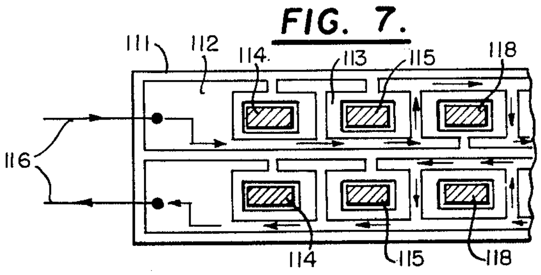
FIG. 7 is a plan view of a portion of a patterned strip of conductive material for use as conductors in a bank of cores in accordance with this invention.
Figure 8:
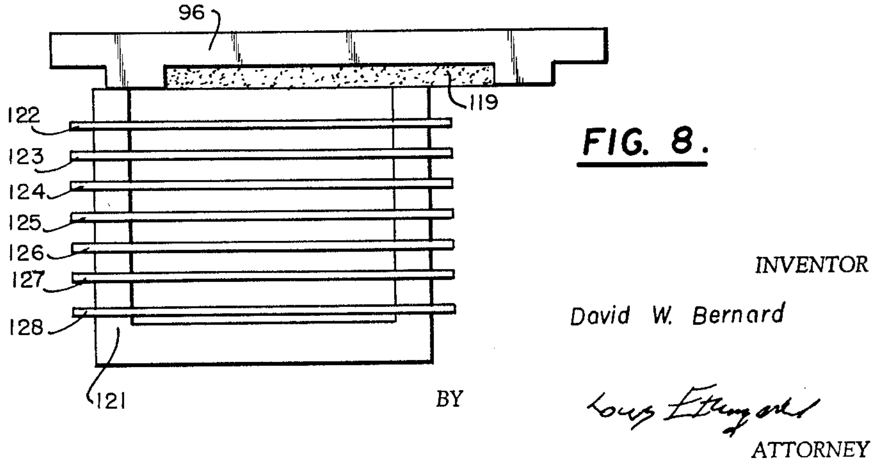
FIG. 8 is a side view of a core bank with a stack of the conductors shown in FIG. 7 contained therein.

In FIGS. 1 through 5, the conductors passing through the cores were illustrated and described as wires. However, threading small wires through a plurality of small cores is a tedious and expensive task which may result in a high number of errors. A more practical means for providing the cores with the proper number of conductors in accordance with a selected code is shown in FIGS. 7 and 8. In FIG. 7 a strip 111 of thin insulating material, such as a synthetic resin, is coated on one face with a thin film 112 of copper, silver, or other good electrical conductor. The conductor 112 is arranged in two parallel parts with suitable output wires 116 connected to their left hand ends. Their right hand ends are connected together. Thus, as the arrows indicate, a complete circuit is formed which enables current to enter one of the parallel parts and return along the other part. The laminated tape is punched to provide a series of substantially equally spaced perforations or slots 113 of substantially uniform size. Cores such as 114, 115 and 118 are mounted in the perforations 113. The strip 111 of insulating material is coated only over a portion of its surface with the conductive film 112, an uncoated edge being provided about each of the perforations 113 to avoid the inadvertent short-circuiting of the conductors by the cores 114, 115 and 118. As shown in FIGS. 7 and 8, the cores are arranged with their legs vertical and one leg passing through each of the pair of adjacent perforations 113 so that the slide member 96 may be moved over the top or bottom surfaces of the legs in a plane generally parallel to the strip 111. The cores straddle the center portion of strip 111. In FIG. 8, a stack of seven similar strips 122, 123, 124, 125, 126, 127, and 128 are shown with aligned perforations 113 through which the legs of several cores such as 121 are inserted. In this view, the relationship of the various parts: strips, cores and magnetic members, are shown.

In order to encode digital inforamtion, pulses in prescribed combinations must be generated as representative of each character. The number of pulses generated for each character depends upon the number of different combinations desired. Thus, if only the ten decimal digits are used, the code requires only four pulse levels in combination. But if numbers, letters, symbols such as punctuation marks, and control digits are all desired, then as many as seven or eight pulse levels may be required for each character. One strip such as that shown in FIG. 7 may be used for each level in the pulse combination, and the several strips for generating all of the pulses of the combination may be stacked as shown in FIG. 8.

Each of the levels, considering strip 111 of FIG. 7 as an example, may be arranged in a pattern which interrupts the conductor 112 along portions of its path so that no more than one of the two parallel parts threads through any given core 114, 115, and 118, in inductive relationship therewith. Thus only the upper part threads through the first two cores 114 and 115, and only the lower part threads through the third core 118. Therefore the cores 114 and 115 tend to induce a signal in the conductor 112 the polarity of which is indicated by the arrows, while the core 118 tends to induce an opposite polarity therein. If either of the cores 114 or 115 were completely closed by its associated magnetic member, then an output pulse, in the direction of the arrows, would be induced in the conductor 112 when a drive pulse is applied to all of the cores along the common drive winding (not shown in FIGS. 7 and 8). In contrast, if the core 118 were completely closed by its magnetic member, an opposite output pulse would be induced in the conductor 112, this reverse pulse being usable for compensation as explained above. Thus the pattern of the conductor 112 determines which of the cores 114, 115, and 118 produce a signal output and which produce a compensation output at the particular code level represented by the strip 111. A complete code output for the character represented by any particular core such as 121 would consist of the particular combination of signal (and compensation) outputs induced by that core in the respective conductors of the various code levels represented by several strips such as the stack 122–128.

To avoid short circuiting and the improper flow of current from one strip to another in this stack, insulating layers such as 111 and conductive layers such as 112 are alternately interleaved so that an insulating layer is adjacent both sides of a conductive strip. In other words, the conductive portions of adjacent levels in the stack 122–128 are not placed adjacent each other.

The common drive winding may also be conveniently constructed of a conductive layer plated over an insulating strip. The strip could be added to the stack 122–128 in the manner described, and the conductive layer could be arranged to thread through all the cores in several turns to form the common drive winding.

This specification has described and illustrated a new system for converting mechanical motion information into coded digital form by the use of magnetic cores. The invention of this specification is rugged and simple in construction, yet accurate and reliable in its operation. It is realized that the above description will indicate to others in this art other ways in which the principles of this invention can be used without departing from the spirit of the invention. It is, therefore, intended that this invention be limited only by the scope of the appended claims.

I claim:

1. Apparatus for converting information from a keyboard into a digital code, said apparatus comprising a keyboard having a plurality of individually operable keys each of which represents a unique item of information, a magnetic core positioned adjacent each of said keys, each of said cores having an air gap, magnetic means mounted on said keys to be moved therewith and arranged to close the air gap, and thus complete the magnetic circuit, within the core adjacent the operated key when the key is operated, electrical conductor means threading said cores in combinations according to a digital code, and means for simultaneously generating a magnetic field in all of said cores, the reluctance of the cores with closed air gaps being sufficiently low to cause the induction of electrical potentials in the conductor means threading said cores when a magnetic field is generated therein.

2. Apparatus for encoding information, said apparatus comprising a group of individually movable members, each member representing an individual item of information to be encoded, a magnetic core having an air gap adjacent each member, a magnetic member associated with and movable with each movable member, said magnetic member closing the air gap, and thus completing the magnetic circuit; within the core adjacent it when its movable member is moved, electrical signal conductors passing through the cores in a pattern which represents the information code, and means for periodically generating a magnetic field in all of the cores at the same time, the reluctance of only the cores with closed air gaps being sufficiently low to permit the generation of electrical signal pulses on the conductors passing through these cores.

3. Apparatus for encoding information, said apparatus comprising a plurality of magnetic cores, each core having an air gap, electrical signal conductors passing through said cores in combinations which represent the digital code for the informaiton to be encoded, each core representing a single item of information, magnetic means arranged to close the air gaps, and thus complete the magnetic circuit, within selected cores, and means for simultaneously generating magnetic flux in all of said cores, only the cores with closed air gaps having a sufficiently low reluctance to cause the generation of electrical pulses in said signal conductors when said cores have magnetic fluxes generated therein.

4. Apparatus for the encoding of information into digital form, said apparatus comprising a plurality of magnetic cores each representing a separate item of information to be encoded, a plurality of signal conductors threaded through said cores in group combinations which represent the digital code of the item of information represented by the individual cores, each core having an air gap, means movable in response to information to be encoded for closing the air gaps, and thus completing the magnetic circuit, within the appropriate cores, and means for simultaneously magnetically energizing all of said cores to generate magnetic flux in all of said cores, the generation of said magnetic flux generating electrical signal pulses of sufficient amplitude to be used in only the conductors threaded through those cores with closed air gaps.

5. The apparatus defined in claim 4 wherein said cores are equal in number of individual items of information to be encoded.

6. The apparatus defined in claim 4 wherein each of said signal conductors represents a single level of a digital code, the number of said signal conductors used being equal to the number of code levels being used, said signal conductors individually passing through some of said cores in accordance with the presence in the code of that code level being present in the code combination for the individual items of information.

7. The apparatus defined in claim 4 wherein said movable means comprises a separate magnetic means for each core.

8. The apparatus defined in claim 7 wherein each of said magnetic means is mounted for movement on a separate mechanically movable input means, and wherein said input means are each representative of a single item of information to be encoded.

9. The apparatus defined in claim 8 wherein said input means are mounted together to form an information input station where information may be inserted and encoded by the movement of any input means.

10. The apparatus defined in claim 9 wherein said information input station comprises a keyboard, and wherein said input means comprises the individual keys of said keyboard, and wherein there is a core and a magnetic means associated with each key and wherein said magnetic means are individually mounted to be moved with individual keys.

11. The apparatus defined in claim 10 wherein said cores are U-shaped, and wherein said magnetic means are arranged adjacent the open side of said cores.

12. The apparatus defined in claim 11 wherein said magnetic means are slidably movable across the open side of said core into positions which close the air gaps of said cores.

13. The apparatus defined in claim 11 wherein said magnetic means are pivoted at one end on a portion of the open side of the cores, and wherein movement about said pivot moves the individual magnetic members into position to close the air gaps of said cores.

14. The apparatus defined in claim 11 further including a compensating core for each signal conductor, first and second winding means on each of said compensating cores, means for connecting said first winding to one of said signal wires, and means for connecting said second winding to said means for simultaneously generating magnetic flux in all of said cores, said first and second windings being wound so that the flux generated by one winding is in opposition to the flux generated by the other winding.

15. The apparatus defined in claim 4 wherein each of said signal conductors comprises a conductive film supported by an insulating strip.

16. The apparatus defined in claim 15 wherein there are as many layers of strips and films as there are levels in said code, the films being shaped so that current will pass only through portions of the film passing through the cores which represent those characters having that level pulse in their code combinations.

17. The apparatus defined in claim 4 wherein said signal conductors are passed in a first direction through some of said cores in accordance with the requirements of a code and in the opposite direction through other cores to compensate for leakage pulses when said magnetic flux is generated.

18. The apparatus defined in claim 8 further comprising an adjustable member to adjust the final position of said magnetic member.

References Cited in the file of this patent

UNITED STATES PATENTS 2,997,703 Powell ---------------- Aug. 22, 1961